US012712361B2

(12) United States Patent
Kadam et al.

(10) Patent No.: US 12,712,361 B2
(45) Date of Patent: Aug. 18, 2026

(54) INTELLIGENT BATTERY MANAGEMENT SYSTEMS AND METHODS

(71) Applicant: JinkoSolar (U.S.) Inc., San Francisco, CA (US)

(72) Inventors: Rohit Kadam, Clifton Park, NY (US); Adam Detrick, Oakland, CA (US)

(73) Assignee: JINKOSOLAR (U.S.) INC., San Francisco, CA (US)

( * ) Notice: Subject to any disclaimer, the term of this patent is extended or adjusted under 35 U.S.C. 154(b) by 602 days.

(21) Appl. No.: 18/199,897

(22) Filed: May 19, 2023

(65) Prior Publication Data

US 2024/0388087 A1 Nov. 21, 2024

(51) Int. Cl.

| | |
|---|---|
| ***H02J 7/50*** | (2026.01) |
| ***G05B 13/02*** | (2006.01) |
| ***H02J 3/001*** | (2026.01) |
| ***H02J 7/00*** | (2006.01) |

(52) U.S. Cl.

CPC .......... *H02J 3/001* (2020.01); *G05B 13/0265* (2013.01); *H02J 7/50* (2026.01); *H02J 7/855* (2026.01)

(58) Field of Classification Search

None

See application file for complete search history.

(56) References Cited

U.S. PATENT DOCUMENTS

2020/0313456 A1* 10/2020 Song .......................... H02J 7/02
2021/0098833 A1* 4/2021 Harris ................... H02J 7/0013
2021/0316637 A1* 10/2021 Slepchenkov .......... B60L 58/26

* cited by examiner

*Primary Examiner* — Paul B Yanchus, III
(74) *Attorney, Agent, or Firm* — BAYES PLLC

(57) ABSTRACT

Embodiments of the disclosure provide a method for managing an AC block. The AC block includes a plurality of battery storage units, a plurality of battery management controllers each assigned to a battery storage unit, and a power conversion system. The method includes acquiring, by each battery management controller, status information of the battery storage unit to which the battery management controller is assigned; and gaining awareness, by each battery management controller, of the status information of neighboring battery storage units of the AC block. The method further includes dynamically designating one of the plurality of battery management controllers as a lead controller; and dispatching, by the lead controller, the power conversion system to convert between DC energy stored in the plurality of battery storage units and AC energy based on collective status information of the plurality of battery storage units.

20 Claims, 7 Drawing Sheets

INTELLIGENT BATTERY MANAGEMENT SYSTEMS AND METHODS

TECHNICAL FIELD

The present disclosure relates to battery management and more particularly to, an intelligent battery management system for an AC block that grows data awareness among battery management systems (BMS) for the battery storage units therein and designates a lead controller among them to dispatch the overall AC block.

BACKGROUND

Current lithium ferro-phosphate (LFP) battery management systems (BMS) typically use a multi-level topology-level 1 is for battery pack, level 2 for battery rack, and level 3 for battery container. These BMS boards are limited in power and capacities. They are limited to localized awareness, i.e., they only have information about the batteries within the container itself. For large scale commercial battery storage systems, battery racks or battery containers are paired with a power conversion system (PCS) to build an AC block. However, due to level 2 or level 3 BMS being limited to its container or rack, a higher level BMS (level 4) or controller is used to control the lower-level BMS below it. This level 4 BMS then takes dispatching orders from an energy management system (EMS) to dispatch the layer 3 battery storage units in the AC block. However, by including the additional level 4 BMS, this configuration adds another level of failure and reduces the productivity of the power plant.

Another popular topology is a 2 level BMS architecture with a string PCS design. Tesla™ Megapack is a good example of this architecture. In this 2 level BMS architecture, a string of mini PCS are each paired with a level 2 BMS. The string PCS then take dispatch instructions from a higher level EMS and communicate with the downstream level 2 BMS. The advantage of this design is that it allows flexible capacity and higher productivity. But these systems are complex in nature. Pairing the battery racks with multiple string PCS prohibits squeezing the battery racks and string PCS. As a result, the 2 level BMS systems cannot achieve denser battery containers and thus are limited in capacity.

Embodiments of the disclosure address the above problems by providing an intelligent battery management system that directly uses an existing battery management systems (BMS) of a lower level as a lead controller for managing the overall AC block.

SUMMARY

Embodiments of the disclosure provide an exemplary method for managing an AC block. The AC block includes a plurality of battery storage units, a plurality of battery management controllers each assigned to a battery storage unit, and a power conversion system. The method includes acquiring, by each battery management controller, status information of the battery storage unit to which the battery management controller is assigned; and gaining awareness, by each battery management controller, of the status information of neighboring battery storage units of the AC block. The method further includes dynamically designating one of the plurality of battery management controllers as a lead controller; and dispatching, by the lead controller, the power conversion system to convert between DC energy stored in the plurality of battery storage units and AC energy based on collective status information of the plurality of battery storage units.

Embodiments of the disclosure also provide an exemplary method for dispatching an AC block. The AC block includes a plurality of battery storage units, a plurality of battery management controllers each assigned to a battery storage unit, and a power conversion system. The method includes sending a first dispatch instruction to an initial lead controller. The initial lead controller is one of the plurality of battery management controllers. The method further includes detecting a failure of the initial lead controller; and sending a second dispatch instruction to a new lead controller. The new lead controller is another one of the plurality of battery management controllers.

It is to be understood that both the foregoing general description and the following detailed description are exemplary and explanatory only and are not restrictive of the present disclosure, as claimed.

DETAILED DESCRIPTION

Figure 1:
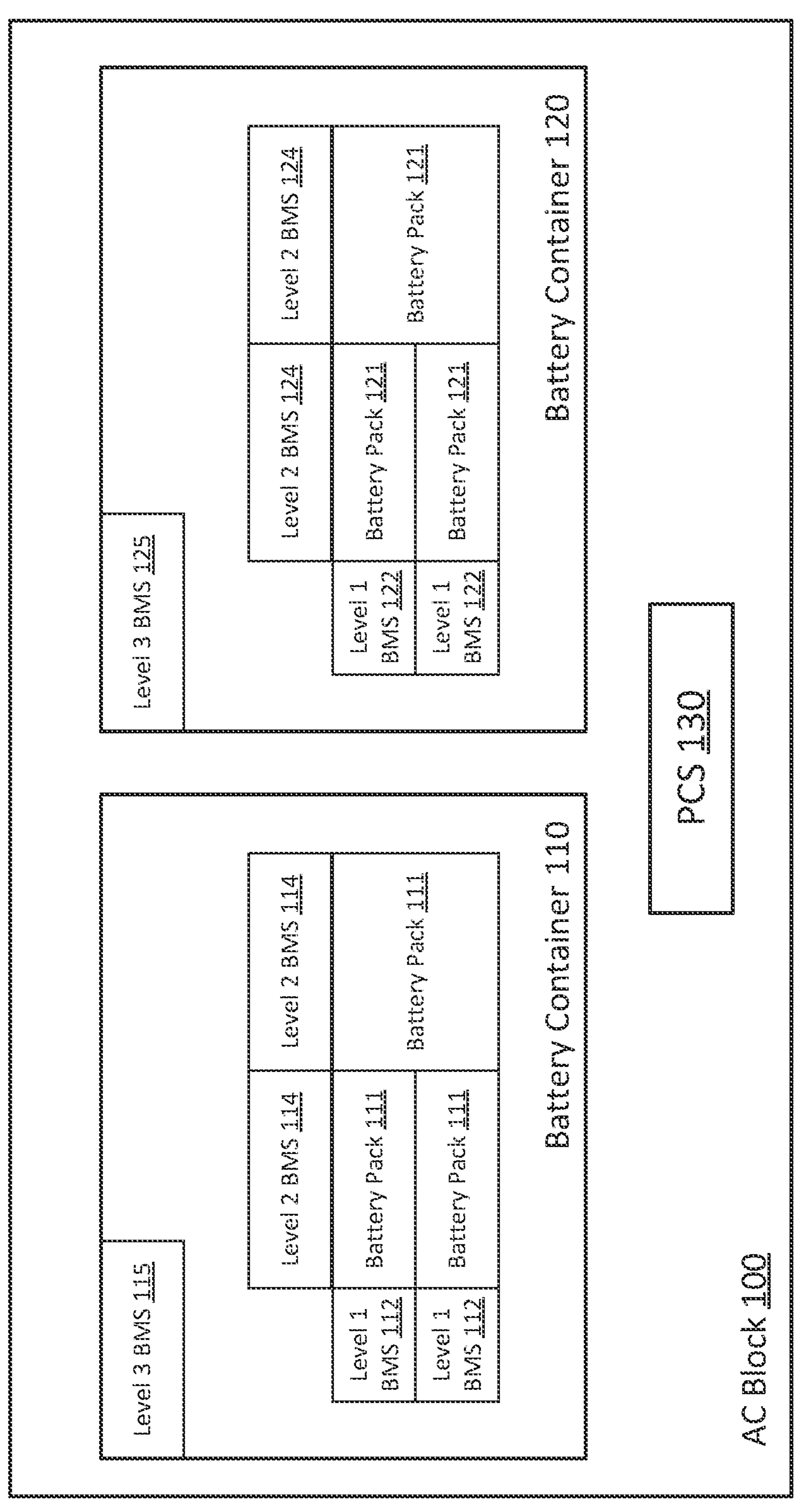
FIG. 1 illustrates a schematic diagram of an exemplary AC block containing multiple battery containers, according to embodiments of the disclosure.

Reference will now be made in detail to the exemplary embodiments, examples of which are illustrated in the accompanying drawings. Wherever possible, the same reference numbers will be used throughout the drawings to refer to the same or like parts.

Embodiments of the present disclosure provide a system for managing an AC block including a plurality of battery storage units and a power conversion system and an AC block managed by the system. The system includes a plurality of battery management controllers each assigned to a battery storage unit in the AC block and manages status information of the corresponding battery storage unit. Each battery management controller is communicably connected with the battery management controllers assigned to neighboring battery storage units to gain awareness of status information of the neighboring battery storage units. By growing the awareness of its neighboring battery storage units, each battery management controller builds a circle of influence. In some embodiments, with that global awareness, the battery management controllers may build a multi-dimensional state matrix with the collective status information of all or a group of the battery storage units in the AC block. The status information of a battery storage unit may include, e.g., a battery capacity, a state of charge, a state of health, a bus voltage, a charge current limit, a discharge current limit, and a fault state of that battery storage unit.

Consistent with the disclosure, one of the battery management controllers is designated as a lead controller. In some embodiments, the lead controller can be automatically redesignated from an initial lead controller to a new lead controller upon a failure of the initial lead controller while the AC block is in use. For example, the new lead controller can randomly elected from the battery management controllers assigned to the neighboring battery storage units of the initial lead controller, or elected from the battery management controllers assigned to the neighboring battery storage units of the initial lead controller according to a circle of influence of each battery management controller. In some embodiments, the failure of the initial lead controller can be detected when the initial lead controller does not respond after a predetermined number of attempts to send a dispatch instruction to the initial lead controller.

Consistent with the disclosure, the lead controller is configured to dispatch the power conversion system of the AC block to convert between DC energy stored in the battery storage units and AC energy based on the collective status information of these battery storage units. In some embodiments, the dispatch of the power conversion system is in response to the dispatch instruction from an energy management system external to the AC block.

The disclosed battery management system can be used on different levels. For example, it can be implemented for level 2 BMS to manage battery racks to avoid using a separate level 3 BMS. In that case, the battery storage units are battery racks and the battery management controllers are level 2 BMS designated to those battery racks. It can also be implemented for level 3 BMS to manage battery containers to avoid using an additional level 4 BMS. Accordingly, the battery storage units are battery containers and the battery management controllers are level 3 BMS designated to those battery containers.

By growing global awareness of status information among the BMS at the same level and designating an existing BMS at the current level as a lead for receiving and executing dispatching instructions, the disclosed intelligent battery management system avoids the use of an additional high-level BMS. As a result, the disclosed battery management controller and associated architecture can be used for controlling more energy dense battery containers to achieve lower LCOS (levelized cost of storage) and reduce the overall footprint of the battery power plant. The features and advantages described herein are not all-inclusive and many additional features and advantages will be apparent to one of ordinary skill in the art in view of the drawings and the following descriptions.

FIG. 1 illustrates a schematic diagram of an exemplary AC block 100 containing multiple battery containers, according to embodiments of the disclosure. Consistent with some embodiments, AC block 100 may include multiple battery storage units, each storing DC battery energy. AC block 100 may be constructed in a multi-level structure. In the example shown in FIG. 1, AC block 100 includes two battery containers: a battery container 110 and a battery container 120. The battery containers are on level 3. Each battery container may be an assembly of multiple battery racks of the same or difference sizes. For example, battery container 110 may include several battery packs 111 of difference sizes and similarly battery container 120 may include several battery packs 121. The battery packs are considered level 2. Each battery pack may be an assembly of battery cells, electrically organized in a row×column matrix configuration. The battery cells are considered level 1. In some embodiments, the battery cells are LPF battery cells. The multi-level configuration enables delivery of targeted range of voltage and current for a duration of time against expected loads.

As illustrated in FIG. 1, each battery container also includes battery management systems (BMS) assigned to manage the battery storage units at different levels. Each battery contains may include one level 3 BMS assigned to manage the battery container, multiple level 2 BMS assigned to manage the battery racks, and multiple level 1 BMS assigned to manage the battery cells. For example, battery container 110 includes a level 3 BMS 115, two level 2 BMS 114, and two level 1 BMS 112. Similarly, battery container 120 includes a level 3 BMS 125, two level 2 BMS 124, and two level 1 BMS 122. These BMS perform various battery managing functions, including, e.g., monitoring the battery storage unit (battery container, battery rack, or battery cell), providing battery protection, estimating the battery's operational state, continually optimizing battery performance, and reporting operational status to external devices.

Consistent with some embodiments, AC block 100 further includes a power conversion system (PCS) 130. PCS 130 is an intermediary device between the DC battery storage units, such as battery container 110 and battery container 120, and the AC power grid or individual AC-consuming loads. PCS 130 may convert DC energy stored in the battery storage units and AC energy. For example, PCS 130 may be dispatched to convert AC energy from the power grid to DC energy to charge the battery storage units inside AC block 100 (known as an AC/DC conversion), or alternatively, convert DC energy from the battery storage units to AC energy to be feed to the AC power grid (known as an DC/AC conversion).

Consistent with some embodiments, AC block 100 may be managed and dispatched by an intelligent battery management system to more efficiently and robustly convert the storage DC battery energy and AC energy of the power grid. The intelligent battery management system utilizes existing BMS in AC block 100, without adding an additional level of BMS, to dispatch PCS 130 for the power conversion.

Although FIG. 1 shows AC block 100 as a level 4 storage unit containing multiple level 3 battery containers, it is contemplated AC block 100 can also be a level 3 storage unit (i.e., a battery container) including multiple level 2 battery racks. The intelligent battery management systems and methods disclosed in this application can apply to both types of AC blocks.

Figure 2:
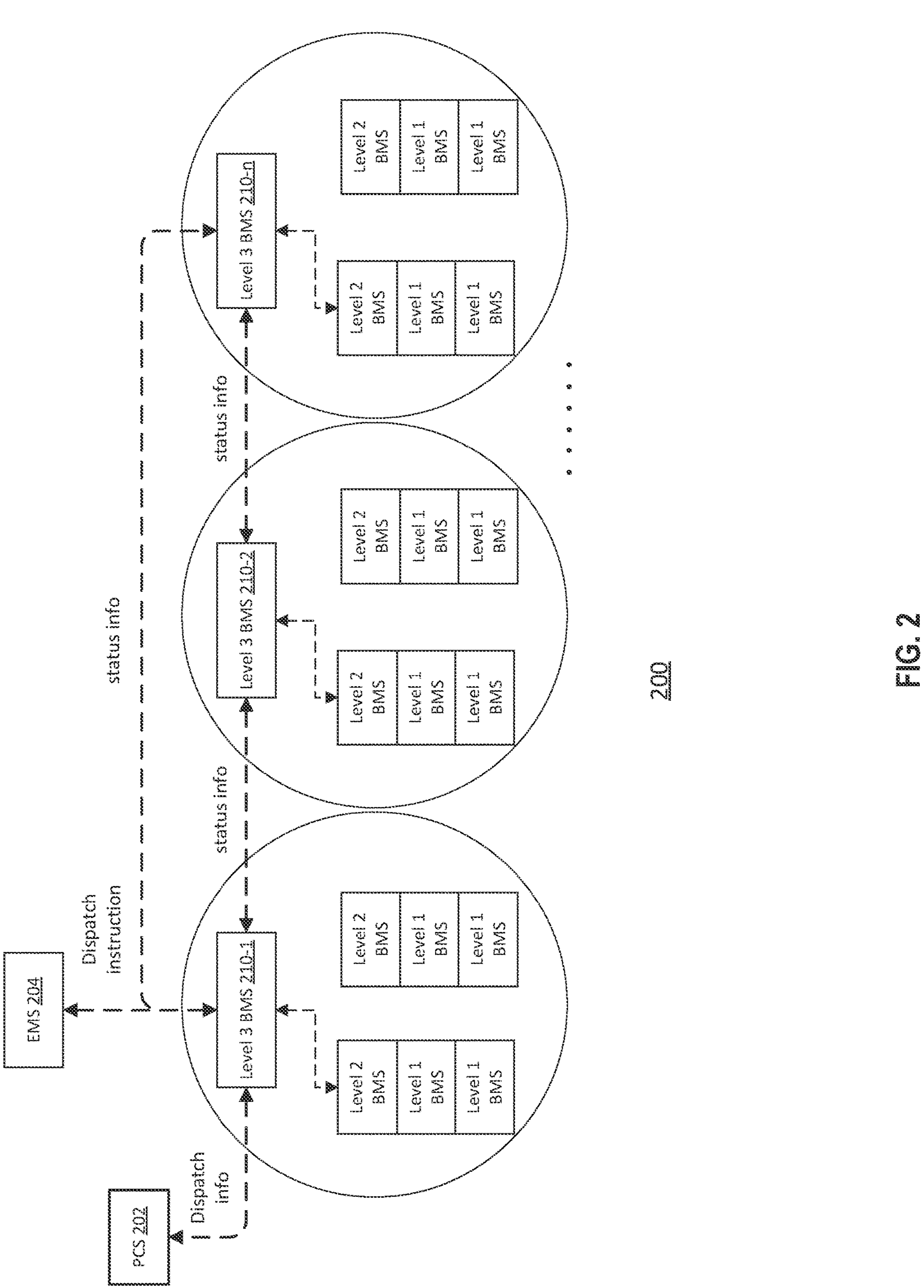
FIG. 2 illustrates a block diagram of an exemplary intelligent battery management system for managing the AC block of FIG. 1, according to embodiments of the disclosure.

FIG. 2 illustrates a block diagram of an exemplary intelligent battery management system 200 for managing AC block 100 of FIG. 1, according to embodiments of the disclosure. Consistent with the present disclosure, intelligent battery management system (BMS) 200 may include various battery management controllers at various levels. For example, as shown in FIG. 2, these battery management controllers include the level 3 BMS assigned to the respective energy containers, along with their downstream (level 1 and level 2) BMS. FIG. 2 shows intelligent BMS 200 includes n level 3 BMS: level 3 BMS 210-1, level 3 BMS 210-2, . . . , and level 3 BMS **210-*n*. Each level 3 BMS is in vertical communication with its level 2 and level 1 BMS. Intelligent BMS 200 is configured to receive dispatch instructions from an energy management system (EMS) 204** and dispatch a PCS 202 to convert between DC and AC energy, without the need of a level 4 BMS or the use of string PCS.

The battery management controllers at various levels within intelligent BMS 200 may perform battery management functions, such as battery pack protection management and capacity management. Battery pack protection management may include electrical protection, which prevents the battery to be damaged via usage outside its safe operating area (SOA), and thermal protection, which involves passive and/or active temperature control to maintain or bring the pack into its SOA. In order to perform the management functions, each battery management controller may monitor the respective battery storage unit (battery container, battery rack, or battery cell) and obtain status information indicating operation status of that battery storage unit.

Figure 3:
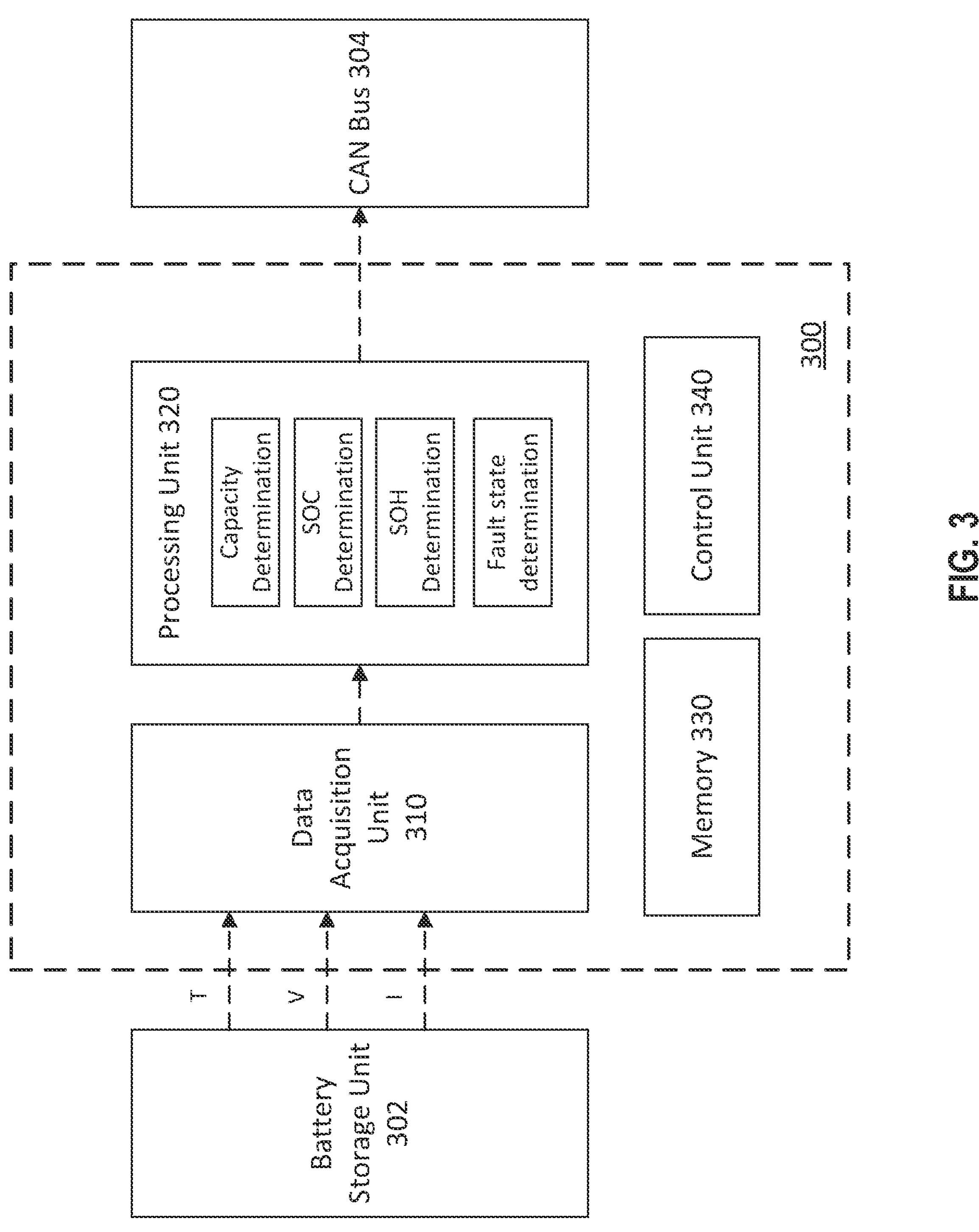
FIG. 3 illustrates a block diagram of an exemplary battery management controller, according to embodiments of the disclosure.

FIG. 3 illustrates a block diagram of an exemplary battery management controller 300, according to embodiments of the disclosure. As shown in FIG. 3, battery management controller 300 is assigned to manage battery storage unit 302, which can be a battery container, a battery rack, or a battery cell. Battery management controller 300 may include various components therein, such as a data acquisition unit 310, a processing unit 320, a memory 330, and a control unit 340. Battery management controller 300 may include more or less units according to different configurations and usages.

Data acquisition unit 310 may include various sensors and detectors to acquire various parameters related to the operation of battery storage unit 302. For example, it may acquire current, voltage, and temperature of battery storage unit 302. The electrical SOA of battery storage unit 302 is bound by current and voltage. Battery cells usually have both maximum continuous charging and discharging current limits and peak charging and discharging current limits. On the other hand, battery cells also should operate within a certain voltage range. Although battery cells have a wide temperature operating range, overall battery capacity diminishes at low temperatures because chemical reaction rates slow down remarkably.

Based on the measurements taken by data acquisition unit 310, processing unit 320 may determine various status information indicating the operating status of battery storage unit 302. For example, processing unit 320 may perform capacity determination, state of charge (SOC) determination, state of health (SOH) determination, and fault state determination. Processing unit 320 may be any appropriate type of general-purpose or special-purpose microprocessor, digital signal processor, or microcontroller. Battery capacity measures the usable capacity of battery storage unit 302, i.e., the energy that battery storage unit 302 can actually deliver in the discharging process. SOC describes the difference between a fully charged battery and the same battery in use. In some embodiments, SOC can be determined as a ratio between the remaining charge in battery storage unit 302, divided by the maximum charge that can be delivered by battery storage unit 302. SOH, on the other hand, describes the difference between a battery in question and a fresh battery and indicates the aging of battery storage unit 302. In some embodiments, SOH can be determined as a ratio of the maximum battery charge to its rated capacity. Both SOC and SOH can be presented as percentages. Determining the SOC and SOH helps estimate the amount of current needed for a safe charge and discharge operation without harming the battery.

Battery fault states indicate any faults that battery storage unit 302 may suffer. For example, fault states may include low state of charge, overcharging, short circuit, open circuit, etc. In some embodiments, the fault states may be determined based on the measured/determined parameters of battery storage unit 302 and predetermined safety thresholds. The status information may be communicated to other devices via a Controller Area Network (CAN) bus 304.

Memory 330 may include any appropriate type of mass storage provided to store any type of information that processing unit 320 may need to operate. Memory 330 may be volatile or non-volatile, magnetic, semiconductor-based, tape-based, optical, removable, non-removable, or other type of storage device or tangible (i.e., non-transitory) computer-readable medium including, but not limited to, a ROM, a flash memory, a dynamic RAM, a static RAM, a hard disk, an SSD, an optical disk, etc. Memory 330 may be configured to store the measured current, voltage, and temperature acquired by data acquisition unit 310, and the status information such as SOC, SOH, and fault states determined by processing unit 320. Memory 330 may be configured to additionally store one or more computer programs that may be executed by processing unit 320 to analyze the measured data.

Control unit 340 may perform various battery control functions based on the data acquired by data acquisition unit 310 and assessments made by processing unit 320. The control functions may include charging and discharging controls. The control functions may also include preventive measures such as overcurrent protection and battery voltage balancing. For example, when the measured current exceeds the current limits, control unit 340 may act to cut-off charging and prevent the battery from overcharging.

Referring back to FIG. 2 and consistent with the present disclosure, intelligent BMS 200 can grow its data awareness from local battery container or rack that it is housed in. For example, level 3 BMS 210-1 may be configured to gain awareness of status information from its neighboring level 3 BMS, such as level 3 BMS 210-2, . . . and **210-*n*. For example, level 3 BMS 210 may receive the status information, such as battery capacity, SOC, SOH, bus voltage, permissible charge/discharge current limits, and battery fault states, of its neighboring battery containers. Level 3 BMS 210-2, . . . and 210-*n* may each send their status information to CAN bus 304 shown in FIG. 3 and level 3 BMS 210-1 may obtain that information from CAN bus 304**.

Each level 3 BMS thus builds its circle of influence. A circle of influence measures the extent of awareness a level 3 BMS gains from its neighboring BMS about the neighboring battery containers, e.g., how many neighboring battery containers it has gained data awareness from. For typical pairing of ‘n’ containers with one power conversion system, ‘n’ level 3 BMS systems will know neighboring BMS states and capacity as their circle of influence increases. For example, FIG. 4 illustrates a schematic diagram showing an exemplary battery management controller growing its circle of influence, according to embodiments of the disclosure.

Figure 4:
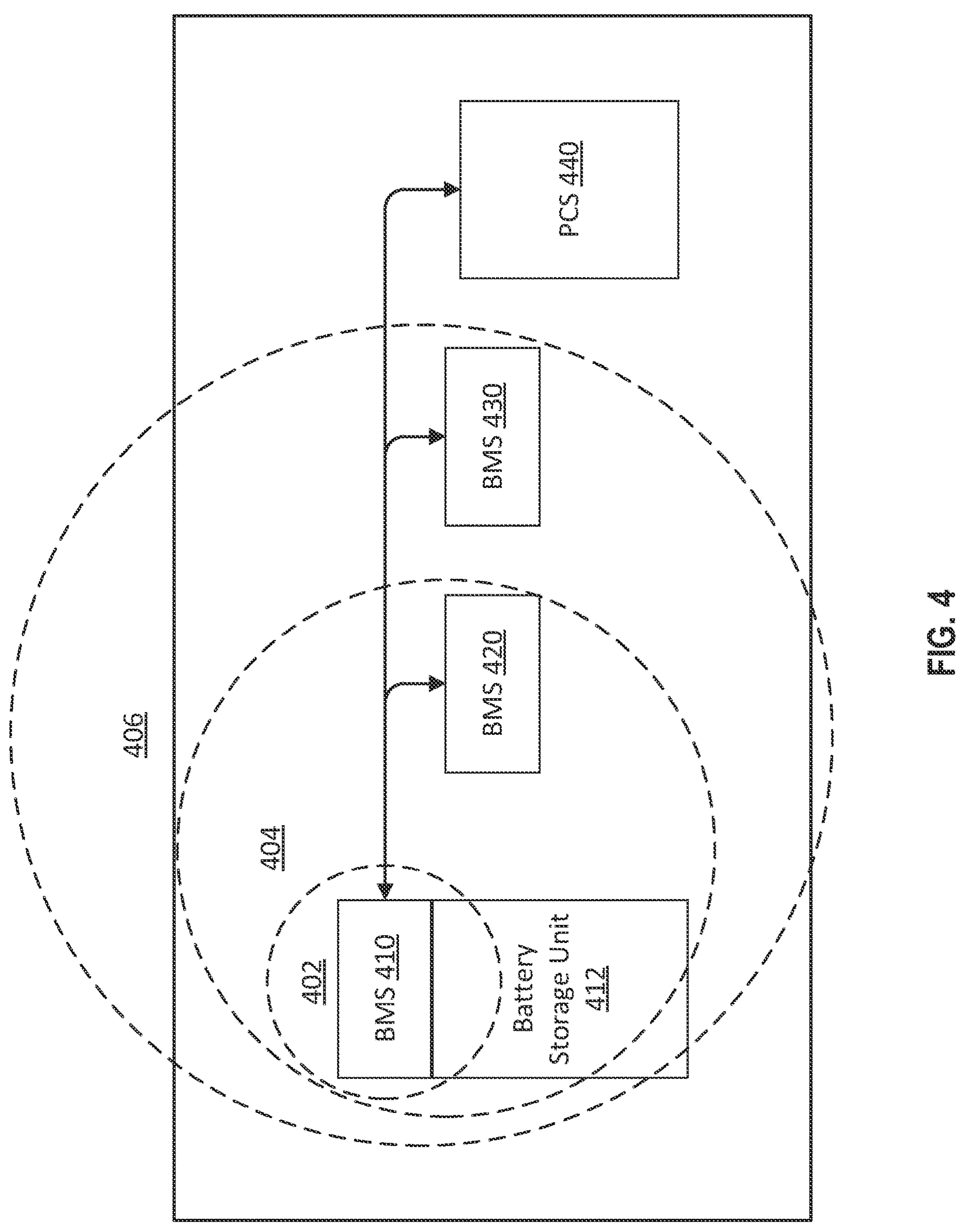
FIG. 4 illustrates a schematic diagram showing an exemplary battery management controller growing its circle of influence, according to embodiments of the disclosure.

As shown in FIG. 4, BMS 410 is assigned to manage battery storage unit 412. BMS 410 is always aware of the status information of battery storage unit 412, and accordingly that circle of influence 402 is local. When BMS 410 gains awareness of the status information of its 1st degree neighbor from neighboring BMS 420, its circle of influence 404 increases to 1. When BMS 410 further gains awareness of the status information of its 2nd degree neighbor from neighboring BMS 430, its circle of influence 406 increases to 2. In some embodiments, PCS 440 may be considered as a 3rd degree neighbor of BMS 410. When BMS 410 establishes communication with PCS 440, its circle of influence further increases to 3.

Referring back to FIG. 2, in some embodiments, intelligent BMS 200 may build out a state matrix or state map of status information for the entire AC block based on the collective status information including the status information acquired by each battery management controller and that learned of the neighboring battery containers by the controller. The state matrix may be a multi-dimensional state matrix that stores the status information with respect to the multiple battery storage units (in FIG. 3, the battery containers) in the AC block. For example, one dimension of the state matrix corresponds to the respective battery containers and another dimension corresponds to the respective state information, such as battery capacity, SOC, SOH, bus voltage, permissible charge/discharge current limits, and battery fault states, of each battery container. In some embodiments, additional dimensions may correspond to the downstream battery racks in each battery container and the status information is further organized according to the respective battery racks.

Consistent with the present disclosure, in intelligent BMS 200, one of the battery management controllers (e.g., a level 3 BMS) may be elected as a lead controller for driving the overall AC block response in coordination with PCS 202 and EMS 204. With the data awareness of neighboring battery storage units, the lead controller has status information of the entire AC block or at least a part of it depending on its circle of influence. As a result, the lead controller is able to handle the communications with PCS 202 and EMS 204 and the dispatch of the overall AC block for energy conversion. When the lead controller is elected, the remaining battery management controllers available online act as subordinate controllers. The ability for intelligent BMS 200 to select a leader from available pool of existing BMS thereby eliminates the need for an additional higher level BMS.

In some embodiments, when the battery management controllers (e.g., level 3 BMS 210-1, 210-2, . . . and **210-*n* shown in FIG. 2) have circles of influence of the same size, the lead controller may be elected randomly among them. For example, level 3 BMS 210-1, 210-2, . . . and 210-*n* may each have a circle of influence including all the n-degree neighbors. In that case, they essentially have the same level of data awareness, i.e., they know each other's status information. Therefore, any of these BMS can act as the lead controller. In some other embodiments, if the battery management controllers have circles of influence of different sizes, e.g., some have higher level of data awareness than others, then the lead controller may be elected according to their circles of influence. For example, if level 3 BMS 210 has awareness of status information from all other level 3 BMS 210-2, . . . and 210-*n*, while level 3 BMS 210-2, . . . and 210-*n* each only have awareness of status information from less than all the level 3 BMS, that means level 3 BMS 210-1 has the largest circle of influence. Therefore, level 3 BMS 210-1 may be elected to lead and the remaining level 3 BMS 210-2, . . . and 210-*n*** become subordinate.

In some embodiments, each battery management controller has a unique identifier, and the lead controller is configured to store the unique identifiers of the battery management controllers assigned to the plurality of battery storage units. For example, each of level 3 BMS 210-1, 210-2, . . . and **210-*n*** has a unique identifier BMS #1, BMS #2, . . . , BMS #n, and these identifiers will be sent to the lead controller.

The elected lead controller may establish connection and communication with PCS 202 and EMS 204. An EMS is a system of computer-aided tools used by operators of electric utility grids to monitor, control, and optimize the performance of the generation or transmission system. EMS 204 may manage multiple AC blocks, including AC block 100. Consistent with embodiments of the present disclosure, to dispatch an AC block, EMS 204 may send dispatch instructions to the lead controller (e.g., level 3 BS 210-1 as shown in FIG. 2). In some embodiments, the dispatch instruction may include (active power command P, reactive power command Q, desired state of charge command SOC). These dispatch commands are based on market requirements and evaluated and acted upon by EMS 204 which then sends appropriate dispatch instructions to the lead controllers in various AC blocks. The lead controller in each AC block receives the dispatch instruction from EMS 204 and develops and sends its dispatch information to PCS 202 to activate PCS 202 for charging or discharging. In some embodiments, the dispatch information may include (P, Q, fault states). As explained above, the lead controller gains awareness of the fault states of other battery storage units in the AC block, and thus can plug that feedback into the dispatch information to PCS 202.

The charging and discharging operations of PCS 202 converts between DC energy stored in the battery storage units and AC energy transmitted on the power grid or used by AC-consuming loads such as an electric vehicle. For example, PCS 202 converts AC energy to DC energy to be stored in the battery storage units during a charging process, and converts DC energy stored in the battery storage units to AC energy during a discharging process. In addition, the lead controller may also be responsible for balancing the capacity and DC voltage for all the battery storage units in the AC block.

In some embodiments, intelligence BMS 200 can redesignate a lead controller at point of failure. Since each BMS is able to build its circle of influence, another one can readily take over as the new leader if the initial leader drops out due to loss of communications or power failure or other reasons. For example, if level 3 BMS 210-1 is the initial lead controller, designated during manufacturing/assembly of the AC block before its use or later elected by intelligent BMS 200 during use of the AC block. When the initial lead controller fails, intelligent BMS 200 may dynamically reelect a new lead controller among level 3 BMS 210-2, . . . , and **210-*n* to take over. Upon redesignation of the new lead controller, the unique identifiers of the other BMS will be passed on to the new leader. In some embodiments, intelligent BMS 200 recalibrates and the new lead controller seamlessly switches over to communicate with PCS 202 and EMS 204. Connection between the new lead controller and EMS 204** may be established. When the initial lead controller comes back online, it silently becomes subordinate to the new lead controller. The new lead controller then updates its circle of influence and becomes aware of the new available data of its neighbors.

In some embodiments, failure of the initial lead controller may be detected when the initial lead controller does not respond after a predetermined number of attempts are made by EMS 204 to send the dispatch instruction to the initial lead controller. For example, after each attempt, if a response is not received from the lead controller within T seconds, EMS 204 may send another dispatch instruction. After N attempts, intelligent BMS 200 may determine that the lead controller has failed and act to reelect/redesignate a new lead controller from the remaining battery management controllers. This design eliminates single point of failure as BMS can select a leader from available pool of BMS thereby increasing overall system uptime and availability.

Figure 5:
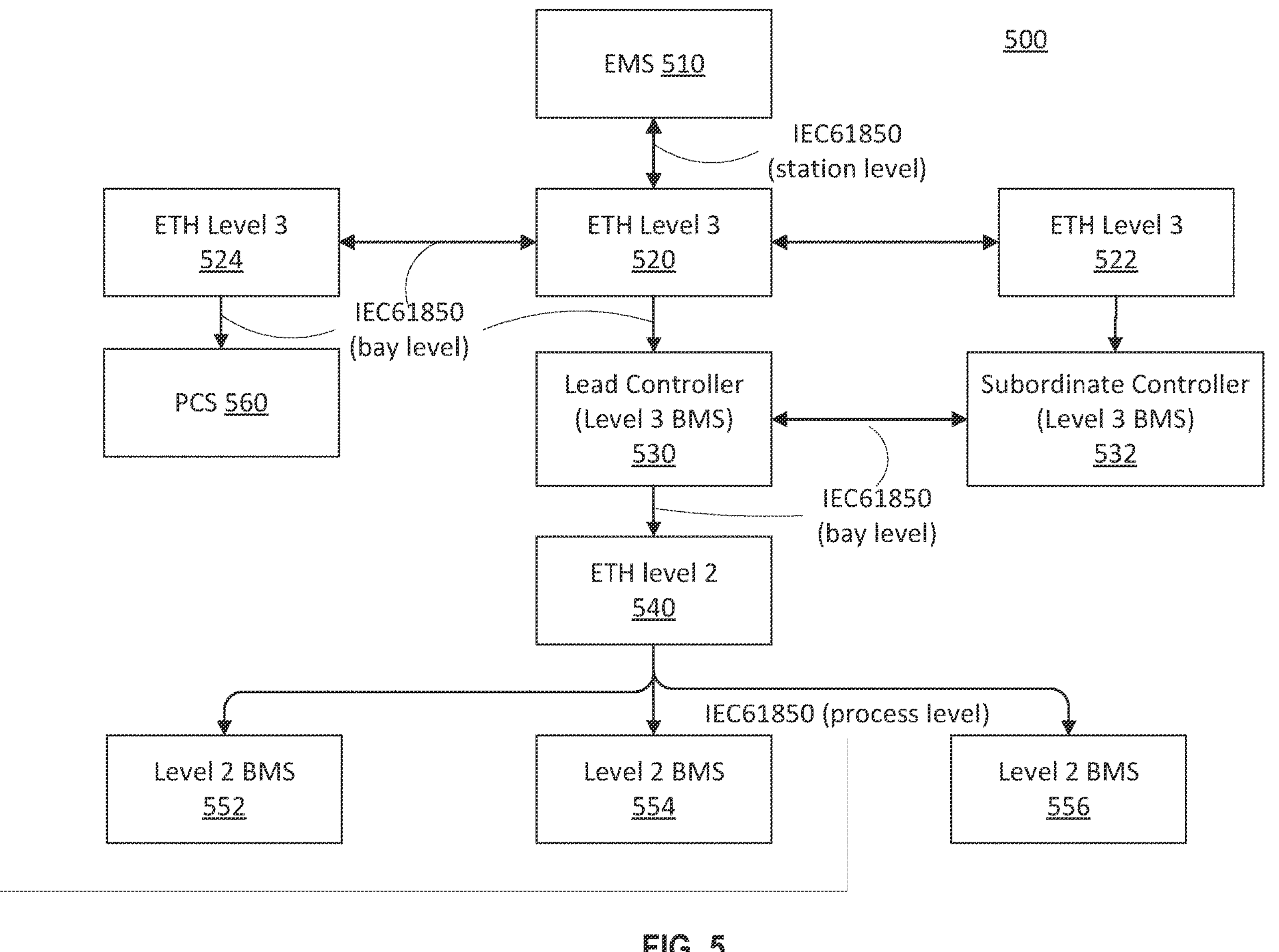
FIG. 5 illustrates a schematic diagram of an exemplary communication network for the intelligent battery management system of FIG. 2, according to embodiments of the disclosure.

FIG. 5 illustrates a schematic diagram of an exemplary communication network 500 for intelligent battery management system 200 of FIG. 2, according to embodiments of the disclosure. Communication network 500 may include various different communication protocols for transmitting signals and data between different components. In the particular example shown in FIG. 5, a client-server architecture is used for the BMS, thus the exemplary BMS includes a lead controller level 3 BMS 530 and subordinate Level 3 BMS 532. It also includes various Level 2 BMS 552, 554, and 556.

In some embodiments, Ethernet based communication standard protocols may be used by communication network 500. As shown in FIG. 5, an Ethernet based IEC 61850 communication protocol may be utilized between lead controller level 3 BMS 530 and its subordinate level 3 BMS's such as subordinate level 3 BMS 532. IEC 61850 communication protocol may also be used among the battery management units (level 3 BMS 530 and level 2 BMS 552-556), power conversion system (PCS 560) and various Ethernet interfaces (e.g., level 3 ETH 520-524 and level 2 ETH 540). More specifically, level 2 BMS 552-556 communicate with ETH 540 and each other over IEC 61850 at the process level, exchanging SOC, voltage, temperature, balancing mode, current, faults and alarms. Level 3 BMS lead controller 530 and its subordinate level 3 BMS's 532 may communicate with ETH 520 and ETH 522 over IEC 61850 applied at the bay level exchanging available capacity, DC bus voltage, charging & discharging current, and max current limits. The designated lead controller level 3 BMS 530 also communicates with PCS 560 through ETH 520 and 524 over IEC 61850 applied at the bay level exchanging control and feedback signals including dispatch active and reactive power commands and target SOC. The communication between designated lead controller Level 3 BMS 530 and ETH 540 is also over IEC61850 communication protocols applied at the bay level. The ETHs (520-524) may communicate with EMS 510 over IEC 61850 at a station level.

IEC 61850 communication standard follows client-server topology and specifies three different communication protocols including MMS (Manufacturing Messaging Specification), GOOSE (Generic Object-Oriented Service Architecture), and SV (Sampled Values) for communicating various signals at different standard defined hierarchy levels. In some embodiments, GOOSE and SV protocols may be used for battery storage systems as they offer high speed communications between devices, high availability, interoperability among multiple vendors, and guaranteed message delivery times among a host of other features including auto-configuration and security support thus making it ideal to adopt it for futuristic battery management systems.

Embodiments of the disclosure provide an exemplary method for managing an AC block. The AC block includes a plurality of battery storage units, a plurality of battery management controllers each assigned to a battery storage unit, and a power conversion system. The method includes acquiring, by each battery management controller, status information of the battery storage unit to which the battery management controller is assigned; and gaining awareness, by each battery management controller, of the status information of neighboring battery storage units of the AC block. The method further includes dynamically designating one of the plurality of battery management controllers as a lead controller; and dispatching, by the lead controller, the power conversion system to convert between DC energy stored in the plurality of battery storage units and AC energy based on collective status information of the plurality of battery storage units.

Figure 6:
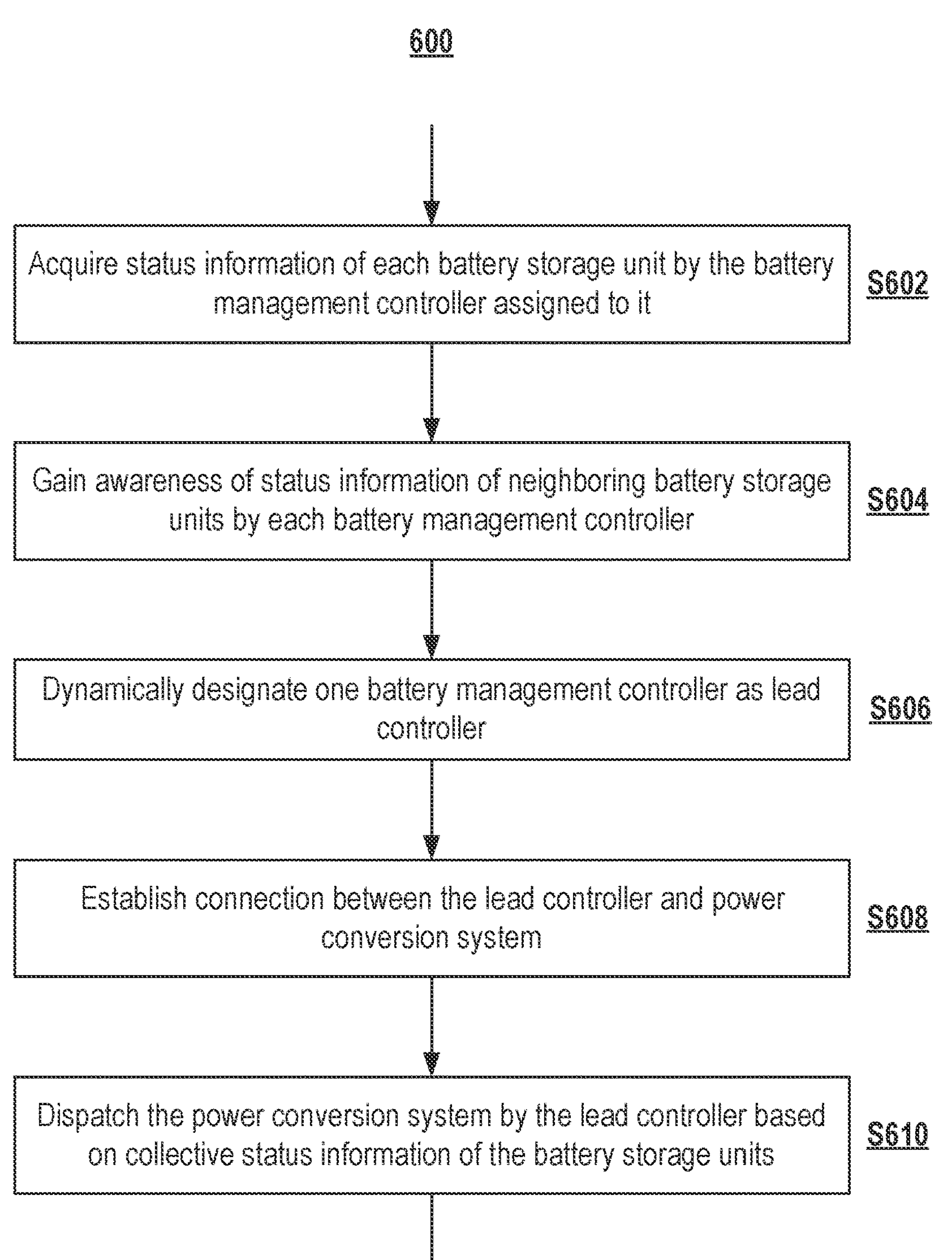
FIG. 6 is a flow chart of an exemplary method for intelligently managing an AC block, according to embodiments of the disclosure.

FIG. 6 is a flow chart of an exemplary method 600 for intelligently managing an AC block, according to embodiments of the disclosure. In some embodiments, method 600 may be performed by intelligent BMS 200. In some embodiments, method 600 may include steps S602-S610. It is to be appreciated that some of the steps may be optional. Further, some of the steps may be performed simultaneously, or in a different order than that shown in FIG. 6.

In step S602, intelligent BMS 200 acquires status information of each battery storage unit by using the battery management controller assigned to it. For example, each of level 3 BMS 210-1, 210-2, . . . , and 210-3 as shown in FIG. 2 acquires status information of their respective battery containers. The communications among the battery management controllers to grow the data awareness may be through a IEC61850 communication standard connecting the various controllers. The status information may include, e.g., battery capacity, SOC, SOH, bus voltage, permissible charge/discharge current limits, and battery fault states. Some of the status information is acquired as direct sensor measurements, e.g., current, voltage, and temperature, by data acquisition unit 310 of FIG. 3. Some is acquired through certain estimation by processing unit 320, e.g., battery capacity, SOC, SOH, and battery fault states. Yet some of the status information is pre-programmed in memory 330 based on the specific battery storage units the BMS is assigned to, e.g., permissible charge/discharge current limits.

In step S604, each battery management controller in intelligent BMS 200 may gain awareness of status information of its neighboring battery storage units. For example, each of level 3 BMS 210-1, 210-2, . . . , and 210-3 as shown in FIG. 2 grows its circle of influence as it gains access to status information of their neighboring battery containers. In some embodiments, each battery management controller ultimately may build a circle of influence of the same size, i.e., each controller aware of the status information of everyone else in intelligent BMS 200. In some other embodiments, the controllers may grow circles of influence of different sizes. In some embodiments, as part of step S604, based on the status information it learned of the neighboring battery containers, a state matrix or state map of status information can be constructed for the entire AC block.

In step S606, intelligent BMS 200 dynamically designates one battery management controller as a lead controller. The lead controller is elected from the existing battery management controllers in the AC block. For example, intelligent BMS 200 may elect level 3 BMS 210-1 as the lead controller as shown in FIG. 2. In some embodiments, when the battery management controllers have circles of influence of the same size, the lead controller may be elected randomly among them. In some other embodiments, if the battery management controllers have circles of influence of different sizes, then the lead controller may be elected according to their circles of influence, e.g., the controller having the largest circle of influence may be elected. In some embodiments, as part of step S606, unique identifiers of the BMS will be passed on to and stored in the lead controller.

In some embodiments, an initial lead controller may be designated prior to the use of the AC block, for example, during its manufacturing as the power plant configuration is known ahead of time, and step S606 is performed to redesignate a new lead controller when a failure occurs at the initial lead controller. For example, in FIG. 2, if level 3 BMS 210-1 is the initial lead controller, when level 3 BMS 210-1 fails, intelligent BMS 200 may dynamically reelect a new lead controller among level 3 BMS 210-2, . . . , and **210-*n*** to take over. Failures of the initial leader may occur when it drops out due to loss of communications or power failure or other reasons.

In step S608, the elected lead controller may establish connection and communication with a power conversion system. For example, as shown FIG. 2, lead controller 210-1 may establish connection with PCS 202. In some embodiments, in step S608, the elected lead controller may also establish connection with an energy management system, e.g., EMS 204. The communications between the lead controller and each of the PCS and EMS may use the Ethernet based IEC61850 communication standard protocols for faster communication.

In step S610, the lead controller dispatches the power conversion system based on the collective status information of the battery storage units to convert between DC energy stored in the battery storage units of the AC block and AC energy to be supplied to the power grid or loads. In some embodiments, the lead controller (e.g., level 3 BS 210-1 as shown in FIG. 2) may receive dispatch instructions from EMS 204, which may include, e.g., (active power P, reactive power Q, desired state of charge SOC). The lead controller then develops and sends its dispatch information, e.g., (P, Q, fault states), to PCS 202. The dispatch information directs PCS 202 to perform power conversion for charging or discharging the battery storage units in the AC block taking into account current limits for charging and discharging. In addition, the lead controller may also act to balance the capacity and DC voltage for all the battery storage units in the AC block.

Embodiments of the disclosure also provide an exemplary method for dispatching an AC block. The AC block includes a plurality of battery storage units, a plurality of battery management controllers each assigned to a battery storage unit, and a power conversion system. The method includes sending a first dispatch instruction to an initial lead controller. The initial lead controller is one of the plurality of battery management controllers. The method further includes detecting a failure of the initial lead controller; and establishing communication with a new lead controller. The new lead controller is another one of the plurality of battery management controllers. The method also includes sending a second dispatch instruction to the new lead controller.

Figure 7:
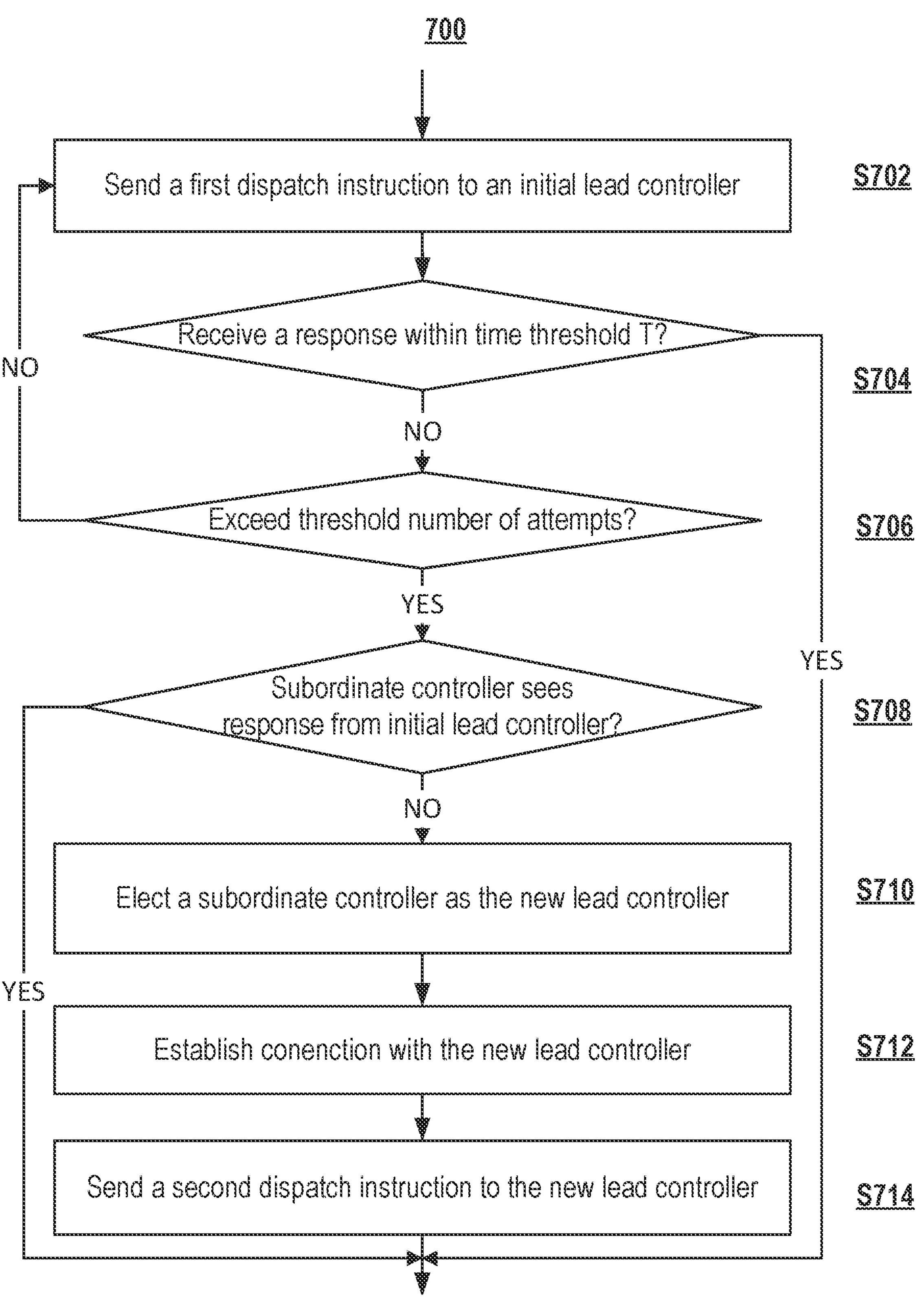
FIG. 7 is a flow chart of an exemplary method for dispatching an AC block for power conversion, according to embodiments of the disclosure.

FIG. 7 is a flow chart of an exemplary method for dispatching an AC block for power conversion, according to embodiments of the disclosure. In some embodiments, method 700 may be performed by EMS 204. In some embodiments, method 700 may include steps S702-S714. It is to be appreciated that some of the steps may be optional. Further, some of the steps may be performed simultaneously, or in a different order than that shown in FIG. 7.

In step 702, EMS 204 sends a first dispatch instruction to an initial lead controller. For example, level 3 BMS 210-1 shown in FIG. 2 may be designated as the initial lead controller, designated during manufacturing/assembly of the AC block before its use or later elected by intelligent BMS 200 during use of the AC block. EMS 204 may send level 3 BMS 210-1 a dispatch instruction (P, Q, SOC) to ask the lead controller to dispatch PCS 202. Other available level 3 BMS, such as level 3 BMS 210-2, . . . , and **210-*n* in FIG. 2**, act as subordinate controllers.

After sending the first dispatch instruction, EMS 204 waits for a response from the lead controller. In step S704, it determines whether a response is received within a predetermined length of time, for example, T seconds. If a response is received (step S704: Yes), EMS 204 determines the lead controller is operating normally, and no more attempt needs to be made. If a response is not received within T seconds (step S704: Yes), EMS 204 determines that the current attempt fails and method 700 proceeds to step S706.

In step S706, EMS 204 determines whether the number of failed attempts have exceeded a threshold number of attempts, e.g., N attempts. If the threshold N has not been exceeded (step S706: No), method 700 returns to step S702 to make another attempt of sending the first dispatch information. If more than N failed attempts have been made (step S706: Yes), intelligent BMS 200 determines that a failure has occurred with the lead controller and method 700 proceeds to step S708. For example, failures of the initial leader may occur when it drops out due to loss of communications or power failure or other reasons. However, for the purpose of this application, EMS 204 does not need to determine the exact cause for the failure.

When a failure of the lead controller renders it irresponsive to the dispatch instructions, it is no longer suitable to act as the leader. In step S708, the subordinate controllers monitor the response from the initial lead controller and determine whether they see a response. All the subordinate level 3 BMS have heartbeat to the lead controller, and therefore know whether the lead controller sends a response. If the subordinate controllers do not see a response from the initial lead controller (step S708: No), method 700 proceeds to step S710. If the subordinate controllers see a response (step S708: Yes), the subordinate controllers determine the lead controller is operating normally, and therefore will not try to replace it.

In step S710, one of the subordinate controller available online is elected as the new lead controller to replace the initial lead controller. For example, in FIG. 2, if the initial lead controller, level 3 BMS 210-1, fails, remaining online level 3 BMS 210-2, . . . , and **210-*n*** may dynamically reelect a new lead controller among them to take over.

In step S712, EMS 204 establishes connection with the new lead controller. In some embodiments, the new lead controller, once designated, may reach out to EMS 204 to request for connection. In some other embodiments, a silent seamless transfer of the new lead controller may occur without disturbing EMS communications. For example, intelligent BMS 200 may recalibrate and seamlessly transition to the new lead controller without impacting the handshake with PCS 202 and EMS 204. As a result of either implementation, EMS 204 establishes connection with the new leader. In some embodiments, the connection may use the Ethernet based IEC61850 communication standard protocol.

In step S714, EMS 204 sends a second dispatch instruction to the new lead controller. Similar to the first dispatch instruction, the second dispatch instruction may also include (P, Q, SOC) to request the new lead controller to dispatch PCS 202.

Although the disclosure is made using a battery management system as an example, the disclosed embodiments are not limited to battery management. They may be adapted and implemented to other types of multi-level management systems that implement only vertical communications, e.g., each controller only communicates with downstream controllers of its lower levels, not ones at the same level. The embodiments may be readily adapted for designing an intelligent management system that expands local data awareness to global awareness, e.g., sharing data among controllers of the same level. The intelligent management system can then designate one of those existing controllers as the lead controller to handle control functions for the overall unit and on behalf of its neighboring controllers.

Another aspect of the disclosure is directed to a non-transitory computer-readable medium storing instructions which, when executed, cause one or more processors to perform the methods, as discussed above. The computer-readable medium may include volatile or non-volatile, magnetic, semiconductor-based, tape-based, optical, removable, non-removable, or other types of computer-readable medium or computer-readable storage devices. For example, the computer-readable medium may be the storage device or the memory module having the computer instructions stored thereon, as disclosed. In some embodiments, the computer-readable medium may be a disc or a flash drive having the computer instructions stored thereon.

It will be apparent to those skilled in the art that various modifications and variations can be made to the disclosed system and related methods. Other embodiments will be apparent to those skilled in the art from consideration of the specification and practice of the disclosed system and related methods.

It is intended that the specification and examples be considered as exemplary only, with a true scope being indicated by the following claims and their equivalents.

What is claimed is:

1. A method for managing an AC block comprising a plurality of battery storage units, a plurality of battery management controllers each assigned to a battery storage unit, and a power conversion system, the method comprising:

acquiring, by each battery management controller, status information of the battery storage unit to which the battery management controller is assigned;

gaining global awareness, by each battery management controller, of the status information of neighboring battery storage units of the AC block from a local bus housed in the AC block, wherein the battery management controllers assigned to the neighboring battery storage units each send the status information of the corresponding neighboring battery storage unit to the local bus;

dynamically designating one of the plurality of battery management controllers as a lead controller; and dispatching, by the lead controller, the power conversion system to convert between DC energy stored in the plurality of battery storage units and AC energy based on collective status information of the plurality of battery storage units.

2. The method of claim 1, wherein the status information of a battery storage unit comprises at least one of a battery capacity, a state of charge, a state of health, a bus voltage, a charge current limit, a discharge current limit, and a fault state of the battery storage unit.

3. The method of claim 2, wherein gaining awareness, by each battery management controller, of the status information of neighboring battery containers of the AC block further comprises:

building a multi-dimensional state matrix, by the battery management controller, with the status information of the battery storage unit directly acquired by the battery management controller and the status information of the neighboring battery storage units learned by the battery management controller.

4. The method of claim 1, wherein dynamically designating one of the plurality of battery management controllers as a lead controller further comprises:

automatically redesignating a new lead controller to replace an initial lead controller upon a failure of the initial lead controller.

5. The method of claim 4, wherein automatically redesignating a new lead controller to replace the initial lead controller further comprises:

randomly electing the new lead controller from the battery management controllers assigned to the neighboring battery storage units of the initial lead controller.

6. The method of claim 4, wherein automatically redesignating a new lead controller to replace the initial lead controller further comprises:

electing the new lead controller from the battery management controllers assigned to the neighboring battery storage units of the initial lead controller according to a circle of influence of each battery management controller, wherein the circle of influence of each battery management controller measures the extent of awareness the battery management controller gains from its neighboring battery management controllers.

7. The method of claim 1, wherein each battery management controller has a unique identifier, wherein dynamically designating one of the plurality of battery management controllers as a lead controller further comprises:

storing, in the lead controller, the unique identifiers of the battery management controllers assigned to the plurality of battery storage units.

8. The method of claim 1, further comprising:

establishing communication from the dynamically designated lead controller to the power conversion system.

9. The method of claim 1, further comprising:

establishing communication from the dynamically designated lead controller to an energy management system external to the AC block.

10. The method of claim 9, wherein dispatching, by the lead controller, the power conversion system to convert between DC energy stored in the plurality of battery storage units and AC energy based on collective status information of the plurality of battery storage units further comprises:

receiving a dispatch instruction from the energy management system; and dispatching the power conversion system of the AC block in response to the dispatch instruction.

11. The method of claim 1, wherein the plurality of battery storage units are battery containers each comprising a plurality of battery racks.

12. The method of claim 1, wherein the plurality of battery storage units are battery racks in a battery container.

13. A method for dispatching an AC block, the AC block comprising a plurality of battery storage units, a plurality of battery management controllers each assigned to a battery storage unit, and a power conversion system, the method comprising:

sending a first dispatch instruction to an initial lead controller, wherein the initial lead controller is one of the plurality of battery management controllers;

detecting a failure of the initial lead controller; and sending a second dispatch instruction to a new lead controller, wherein the new lead controller is another one of the plurality of battery management controllers, wherein the new lead controller gains global awareness of status information of its neighboring battery storage units of the AC block from a local bus housed in the AC block, wherein the battery management controllers assigned to the neighboring battery storage units each send the status information of the corresponding neighboring battery storage unit to the local bus.

14. The method of claim 13, wherein detecting a failure of an initial lead controller further comprises:

attempting the first dispatch instruction to the initial lead controller; and determining that the failure has occurred when the initial lead controller fails to respond to the first dispatch instruction after a predetermined number of attempts.

15. The method of claim 14, wherein determining that the failure has occurred when the initial lead controller fails to respond to the first dispatch instruction after a predetermined number of attempts further comprises:

determining the initial lead controller fails to respond when no response is received from the initial lead controller after a predetermined length of time after each attempt.

16. The method of claim 13, wherein the lead controller is communicably connected with the battery management controllers assigned to its neighboring battery storage units to gain awareness of status information of the neighboring battery storage units, wherein the method further comprises:

dispatching, by the lead controller, the power conversion system to convert between DC energy stored in the plurality of battery storage units and AC energy based on collective status information of the plurality of battery storage units.

17. The method of claim 13, wherein the new lead controller is randomly elected from the battery management controllers assigned to the neighboring battery storage units of the initial lead controller.

18. The method of claim 13, wherein the new lead controller is elected from the battery management controllers assigned to the neighboring battery storage units of the initial lead controller according to a circle of influence of each battery management controller, wherein the circle of influence of each battery management controller measures the extent of awareness the battery management controller gains from its neighboring battery management controllers.

19. The method of claim 13, wherein the plurality of battery storage units are battery containers each comprising a plurality of battery racks.

20. The method of claim 13, wherein the plurality of battery storage units are battery racks in a battery container.

* * * * *